United States Patent
Song et al.

(10) Patent No.: US 10,460,052 B2
(45) Date of Patent: Oct. 29, 2019

(54) PARALLEL MODEL CREATION IN CLOUD PLATFORM

(71) Applicant: SAP SE, Walldorf (DE)

(72) Inventors: Yao Song, Vancouver (CA); Andre Furlan Bueno, Vancouver (CA)

(73) Assignee: SAP SE, Walldorf (DE)

( * ) Notice: Subject to any disclaimer, the term of this patent is extended or adjusted under 35 U.S.C. 154(b) by 196 days.

(21) Appl. No.: 15/389,009

(22) Filed: Dec. 22, 2016

(65) Prior Publication Data

US 2018/0181690 A1    Jun. 28, 2018

(51) Int. Cl.
*G06F 17/50* (2006.01)

(52) U.S. Cl.
CPC ...... *G06F 17/5009* (2013.01); *G06F 17/5095* (2013.01); *G06F 2217/04* (2013.01)

(58) Field of Classification Search
CPC .......................... G06F 17/5009; G06F 2217/04
USPC ............................................................. 703/6
See application file for complete search history.

(56) References Cited

U.S. PATENT DOCUMENTS

| | | | |
|---|---|---|---|
| 7,031,955 B1 * | 4/2006 | de Souza | G06Q 10/00 |
| 2012/0060165 A1 * | 3/2012 | Clarke | G06F 9/5038 |
| | | | 718/104 |
| 2014/0095520 A1 * | 4/2014 | Ziauddin | G06F 16/24557 |
| | | | 707/756 |
| 2017/0163716 A1 * | 6/2017 | Jang | H04L 41/0681 |

FOREIGN PATENT DOCUMENTS

| | | |
|---|---|---|
| CN | 102819616 A  * | 12/2012 |
| CN | 104391948 A  * | 3/2015 |

OTHER PUBLICATIONS

Yang Tao, "A kind of packet reordering analysis model in concurrent multipath transmission", Feb. 2016, ICMMCT, p. 1-7 (Year: 2016).*

* cited by examiner

*Primary Examiner* — Andre Pierre Louis
*Assistant Examiner* — Faraj Ayoub
(74) *Attorney, Agent, or Firm* — Buckley, Maschoff & Talwalkar LLC (57) ABSTRACT

A system, method, and computer-readable medium to receive at least one data table relating to a data set; receive a plurality of dimensions; combine, by a first parallelization process, the plurality of dimensions into a plurality of different clusters, each cluster being a grouping of different dimensions; transmit each of the plurality of different clusters to a cloud platform; divide, by a second parallelization process, the at least one data table into a plurality of different chunks of data; and transmit each of the plurality of different chunks of data to the cloud platform, in parallel to and independent of the transmission of the plurality of different clusters the cloud platform, the cloud platform to generate a data model based on a combination of the transmitted plurality of different clusters and the transmitted plurality of different chunks of data.

14 Claims, 6 Drawing Sheets

```
┌─────────────────────────────────────────────┐
│  RECEIVE AT LEAST ONE DATA TABLE RELATING   │
│  TO A DATA SET FROM AT LEAST ONE DATA       │
│  SOURCE                              505    │
└─────────────────────────────────────────────┘
                      ↓
┌─────────────────────────────────────────────┐
│  RECEIVE A PLURALITY OF DIMENSIONS, THE     │
│  PLURALITY OF DIMENSIONS TO BE USED IN AN   │
│  ANALYSIS OF THE DATA OF THE DATA SET       │
│                                      510    │
└─────────────────────────────────────────────┘
                      ↓
┌─────────────────────────────────────────────┐
│  COMBINE, BY A FIRST PARALLELIZATION        │
│  PROCESS, THE PLURALITY OF DIMENSIONS INTO  │
│  A PLURALITY OF DIFFERENT CLUSTERS, EACH    │
│  CLUSTER BEING A GROUPING OF DIFFERENT      │
│  DIMENSIONS                          515    │
└─────────────────────────────────────────────┘
                      ↓
┌─────────────────────────────────────────────┐
│  TRANSMIT EACH OF THE PLURALITY OF          │
│  DIFFERENT CLUSTERS TO A CLOUD PLATFORM     │
│                                      520    │
└─────────────────────────────────────────────┘
                      ↓
┌─────────────────────────────────────────────┐
│  DIVIDE, BY A SECOND PARALLELIZATION        │
│  PROCESS, THE AT LEAST ONE DATA TABLE INTO  │
│  A PLURALITY OF DIFFERENT CHUNKS OF DATA    │
│                                      525    │
└─────────────────────────────────────────────┘
                      ↓
┌─────────────────────────────────────────────┐
│  TRANSMIT EACH OF THE PLURALITY OF          │
│  DIFFERENT CHUNKS OF DATA TO THE CLOUD      │
│  PLATFORM, IN PARALLEL TO AND INDEPENDENT   │
│  OF THE PLURALITY OF DIFFERENT CLUSTERS     │
│                                      530    │
└─────────────────────────────────────────────┘
```

PARALLEL MODEL CREATION IN CLOUD PLATFORM

BACKGROUND

Enterprise software systems receive, generate, and store data related to many aspects of an enterprise. The size of data files related to an enterprise may be relatively large—several gigabytes in size. In some contexts, some applications and services may be delivered over the internet or other large network (e.g., a WAN or MAN) in a cloud computing architecture (e.g., a Platform as a Service, PaaS). In a scenario where large sized files might need to be transmitted between entities, systems, and platforms, the transfer of the large files may be time consuming and possibly error-prone given the large size of the files being transmitted.

More efficient systems and methods are desired to manage network traffic in a cloud platform environment.

DETAILED DESCRIPTION

The following description is provided to enable any person in the art to make and use the described embodiments. Various modifications, however, will remain readily apparent to those in the art.

In some example contexts, use-cases, and embodiments, one or more terms will be used in the present disclosure. As a matter of introduction and to ease the understanding of the present disclosure, a number of terms will be introduced, where the full meaning of the following terms will be further understood in context of the disclosure herein, on the whole.

Figure 1:
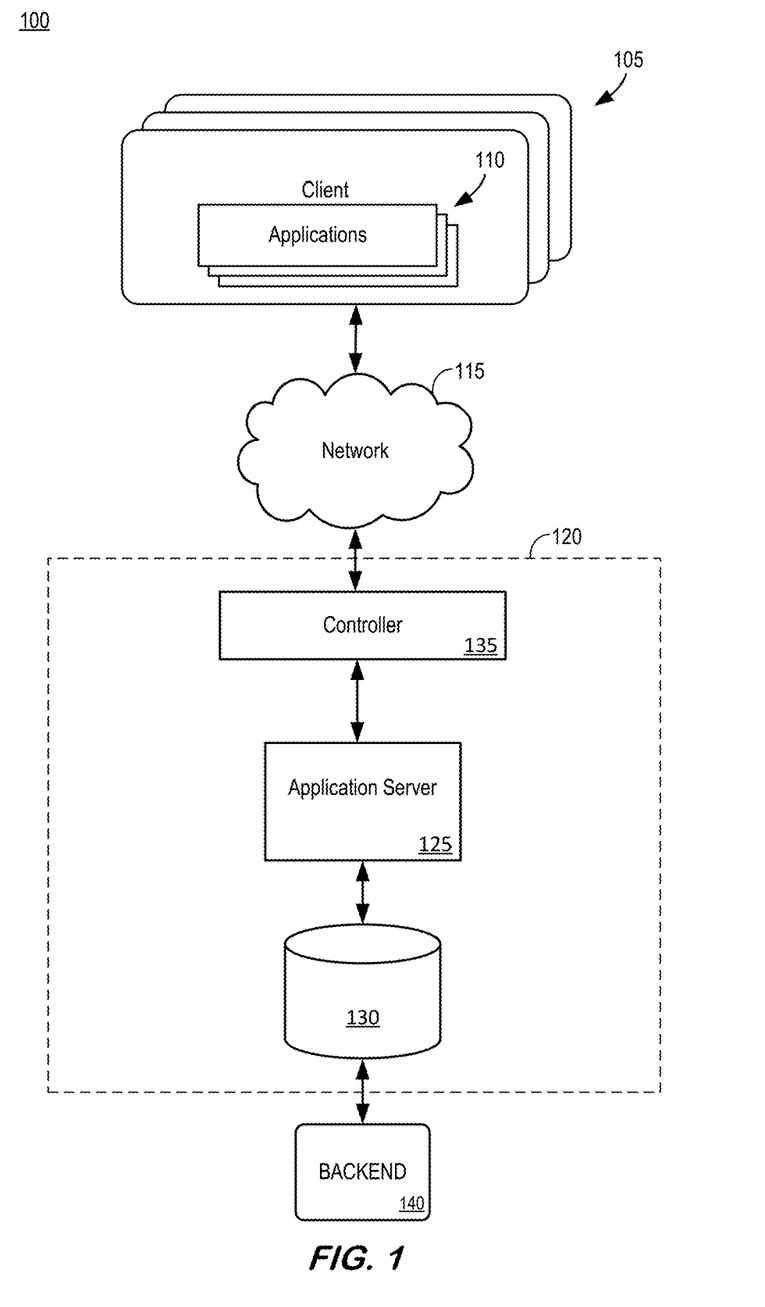
FIG. 1 is an example block diagram of a system.

FIG. 1 is an illustrative block diagram of an architecture or system 100, in one example. Examples of some embodiments of the present disclosure are not limited to the particular architecture 100 shown in FIG. 1. System 100 includes one or more client devices 105 running one or more applications 110. Applications 110 may, in some embodiments, include a suite of different software applications having, at least to some extent, related functionality, similar user interfaces, and some ability to exchange data with each other. Applications 110 may include different software applications that support the operations and process of an organization. In some embodiments, one of the applications 110 may include functionality or a tool to define and create a data model (i.e., model) based on a data set. As used herein, a model is a representation of business data to define relationships, calculations, and data of an organization or business segment. In some embodiments, applications 110 may be configured to facilitate, support, and execute a program to generate a data model in a cloud computing platform (e.g., HANA Cloud Platform (HCP) by SAP SE, the assignee hereof).

The cloud platform 120 may include a controller 135 such as, but not limited to, a PaaS controller. Controller 135 may control storage associated with one or more servers 125. Server 125 may be associated with storage device 130 such as, but not limited to, a storage area network. In some embodiments, cloud platform 120 may include more than one instance of a server such as application server 125 and more than one data storage device 130. Storage device 130 may comprise any query-responsive data source or sources that are or become known, including but not limited to a structured-query language (SQL) relational database management system. Data stored in the storage device 130 may be stored as part of a relational database, a multi-dimensional database, an eXtendable Markup Language (XML) document, or any other data storage system storing structured and/or unstructured data. The data may be distributed among several relational databases, multi-dimensional databases, and/or other data sources. In some embodiments, storage device 130 may be implemented as an "in-memory" database (e.g., HANA), in which volatile (e.g., non-disk-based) storage (e.g., Random Access Memory) is used both for cache memory and for storing the full database during operation, and persistent storage (e.g., one or more fixed disks) is used for offline persistency and maintenance of database snapshots. Embodiments are not limited to any number or types of data sources.

Application server 125 may comprise a computing device that processes requests using a computer processor. For example, each application server 125 may support server-side scripting using Active Server Pages (ASP), Personal Home Page (PHP), or other scripting languages.

The devices at 105 may execute a browser that is used by a user to interface with service 115.

System 100 further includes a backend system that can generate, automatically, in response to a request or call from cloud platform 120, executable code or instructions to perform a process to create and/or support the creation of a model. In some aspects herein, a user may provide an indication or request for one or more models, as implemented in an application 110 and/or cloud platform 120 via network 115, which may operate in cooperation with the processing of a backend system 120 to generate a program or response to effectuate the creation of the model that may be used in rendering a reporting a visualization.

In one example, a client 105 executes an application 110 to generate one or more data models via a user interface (UI) to a user on a display of client 105. The user may manipulate UI elements within the UI to indicate and specify, either explicitly or implicitly, data aspects to include in a model to be generated, where the cloud platform 120, in cooperation with server database 130 and possibly backend system 140, to generate, for example, a model that might be used in an analysis and reporting regarding an enterprise's operational data.

Figure 2:
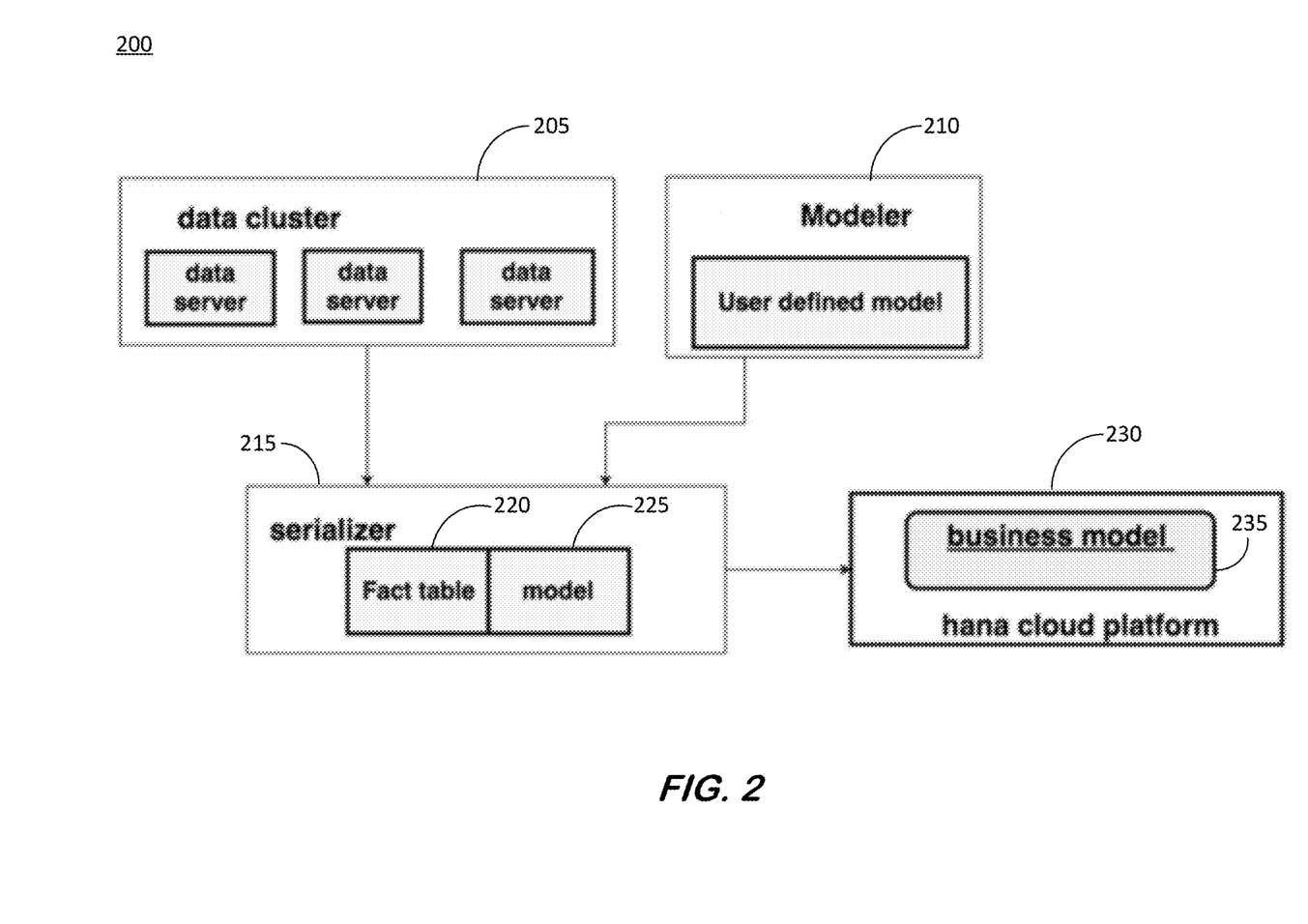
FIG. 2 is an illustrative depiction of an architecture to generate a data model.

FIG. 2 is an illustrative architecture or system 200 to create a model. In particular, system 200 includes a serializer 215 that combines raw data (e.g., tables from a database) from a data source 205 with a user defined model from, for example, a cloud based modeler 210. Data source 205 may include one or more data servers or instances thereof. Serializer 215 operates to combine the raw data including, for example, facts/measures of a data set comprising a fact table 220 and the model 225 from modeler 210. In the example of FIG. 2, a single request is transmitted from serializer 215 to a cloud platform 230 to generate a model 235 using the computing resources of the cloud platform. The single request transmitted to cloud platform 230 includes all of the information to generate business model 235, including fact table 220 and model 225. The size of the data file included in the single request may be several gigabytes in size. The large size of the file may cause undesirably long processing and transmission times. Additionally, the processing of a single large file including all of the information to generate the model may be susceptible to errors and/or long recovery times in the event of a failure in the processing and transmission of the single request.

Figure 3:
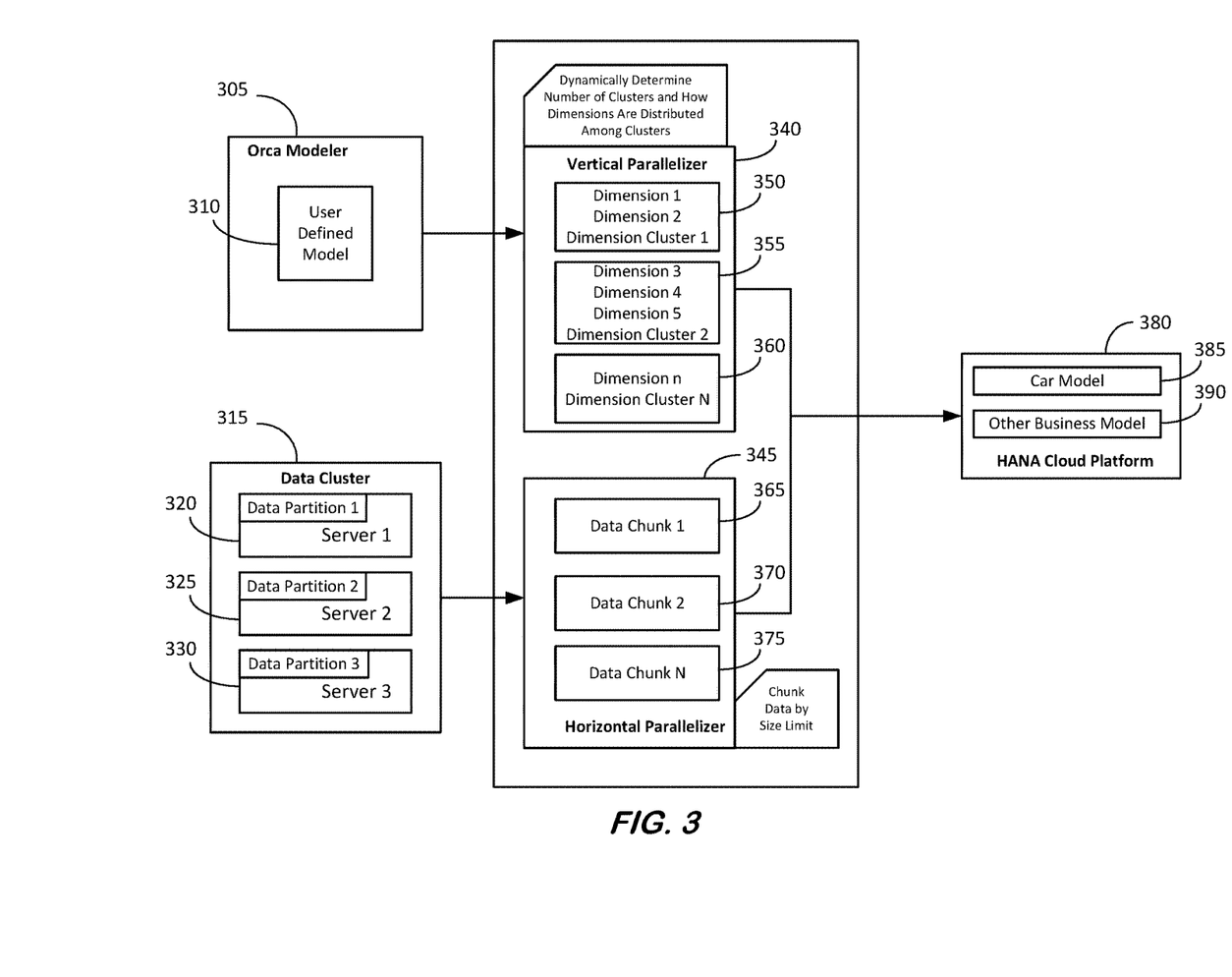
FIG. 3 is an illustrative depiction of an architecture to generate a data model in accordance with some embodiments herein.

FIG. 3 is an illustrative depiction of an architecture or system 300, in accordance with some embodiments herein. System 300 includes a modeler 305 that provides a user defined model 310. The user defined model may include a plurality of dimensions that can be used in the analysis and reporting of data from data source 315. In some instances, the user defined model 310 may be an OLAP (Online Analytical Processing) model. In some instances, user defined model 310 may include thousands of dimensions. As illustrated in FIG. 3, data source 315 includes, as an example, three servers 320, 325, and 330. These servers may provide measures of a data set (e.g., a relational database).

As shown, the source 315 of the measures and the modeler 305 supplying the user defined model are external to a cloud platform 380. As such, these data components need to be transmitted or otherwise forwarded to cloud platform 380 so that the cloud platform can generate a business model (e.g., models 385, 390) based thereon.

In some embodiments, system 300 provides a mechanism to transmit the requisite data to generate a model to a cloud platform in multiple messages. The multiple messages will contain, in aggregate, all of the requisite data to generate the desired model. However, each message in the example of FIG. 3 will contain less data than other methods and systems (e.g., FIG. 2, system 200) where a single request to the cloud platform included all of the data to generate a model.

In some embodiments, system 300 processes the two primary data types or components separately and independently of each other using a distinct parallelization process for each type of data. Moreover, the processing of the two types of data is accomplished simultaneously.

Referring to FIG. 3, the user defined model 310 is forwarded to a first parallelizer 340. Vertical parallelizer 340 operates to combine the dimensions of the user defined model 310 into a plurality of different groupings or clusters. A cluster of dimensions herein refers to a grouping of one or more dimensions. As shown in the example of FIG. 3, parallelizer 340 has grouped the dimensions received thereby into 3 clusters, including dimension cluster 1 (350), dimension cluster 2 (355), and dimension cluster N (360). As further illustrated in FIG. 3, each of the clusters 350, 355, and 360 contain different dimensions.

In some regards, each dimension can be treated independent of other dimensions and can be shipped to the cloud platform/processor 380 concurrently (i.e., parallel) with other dimensions. The different dimensions may be concurrently transmitted, for at least some period of time (i.e., not limited to parallel transmissions). In some embodiments, vertical parallelizer 340 can dynamically determine the number of clusters to be used to ship or transmit a user defined model and how the dimensions are to be distributed amongst the clusters. In some instances, dimensions may not all be the same size. Since the dimensions of the user defined model can be numerous and can vary in size relative to each other, it might not be efficient to simply transmit each dimension concurrently.

As an example, there are 10 dimensions in a user defined model, where dimensions 1-5 are each 1 MB in size and dimensions 6-10 are each 5 MB in size. In this simplified example, dimensions 1-5 may be grouped into a first cluster (e.g., 5 MB sized cluster) while dimensions 6-10 are each in a cluster of their own. In this example, all of the clusters are 5 MB in size. In some embodiments, the size of the dimension clusters can vary.

In some aspects, the creation of a modeling artifact (i.e., dimensions, models) might take a finite amount of time. The time may vary depending on the platform performing the task(s). For example, a repository process of an in-memory database might handle the creation of modeling artifacts where such a process might be single-threaded. Each dimension might need to be activated or made live, which takes some amount of time (e.g., about 1.5 seconds each). Given the many dimensions foreseen in practical examples, the parallelization processing of dimensions might benefit efficiencies.

In some aspects, processing times in system 300 may be increased by including more than 1 dimension in a message sent to cloud platform 380, as well as sending more than 1 message at time. However, care should be taken not to over-burden system 200. In some embodiments, vertical parallelizer 340 may seek to optimize the size of the messages of dimensions (i.e., dimension clusters) shipped to some optimum level. In some aspects, vertical parallelizer 340 may seek to optimize a risk of failure by maintaining a number of dimensions shipped in parallel at any given time below a certain threshold (i.e., how many requests to the cloud platform), since the more processes run in parallel at any given time increases a risk of failure.

Regarding the data table portion (i.e., raw data) 315 of the data comprising the basis for the model to be generated by cloud platform 380, this data may be also processed in parallel. In particular, data 315 may be obtained from one or more data sources outside of the cloud platform and, in some instances, may comprise several gigabytes of data. In some embodiments herein, the data (e.g., 320, 325, and 330) may be divided into a plurality of chunks. As used herein, a "chunk" of data with respect to the table data 315 refers to smaller pieces or sub-sets of the whole set of data 315. In the example of FIG. 3, data 315 is processed by horizontal parallelizer 345 to divide the data into multiple chunks, including data chunk 1 (365), data chunk 2 (370), and data chunk 3 (375). In some embodiments, horizontal parallelizer 345 can transmit the chunks of data processed thereby concurrently (at least in part) and independent of each other.

Multiple requests including the plurality of dimension clusters output by vertical parallelizer 340 and the plurality of data chunks output by horizontal parallelizer 345 are sent, forwarded, or otherwise transmitted to cloud platform 380 in multiple, parallel (concurrent) requests so that a model may be generated by the cloud platform. As shown in FIG. 3, cloud platform 380 may include a facility to store the models 385 and 390 generated therein. These and other models may be saved for a future use, such as, for example, a reporting visualization of an organization's operational data.

In some aspects, vertical parallelizer 340 and horizontal parallelizer 345 each (independent of the other) provides support and facilitates fault isolation in the event of a failure in a request for a model generation by cloud platform 380. For example, instead of a single request including the entirety of the data required for the model generation failing and having to resend and reprocess the entire single request in other systems and methods, some embodiments herein limit the extent of harm due to a failure to an isolated point of failure that can be retransmitted and reprocessed. Thus, in the event of a request failure an entity might only have to resend and reprocess a limited portion of the dimensions and/or fact table associated with the failed request.

The architecture and system 300 provides mechanism(s) including parallelization at both the user define model data and the data tables, as well independent parallelization within dimensions and data chunks. In this manner, architecture and system 300 can provide improved efficiencies and increases in throughput of data.

Figure 4:
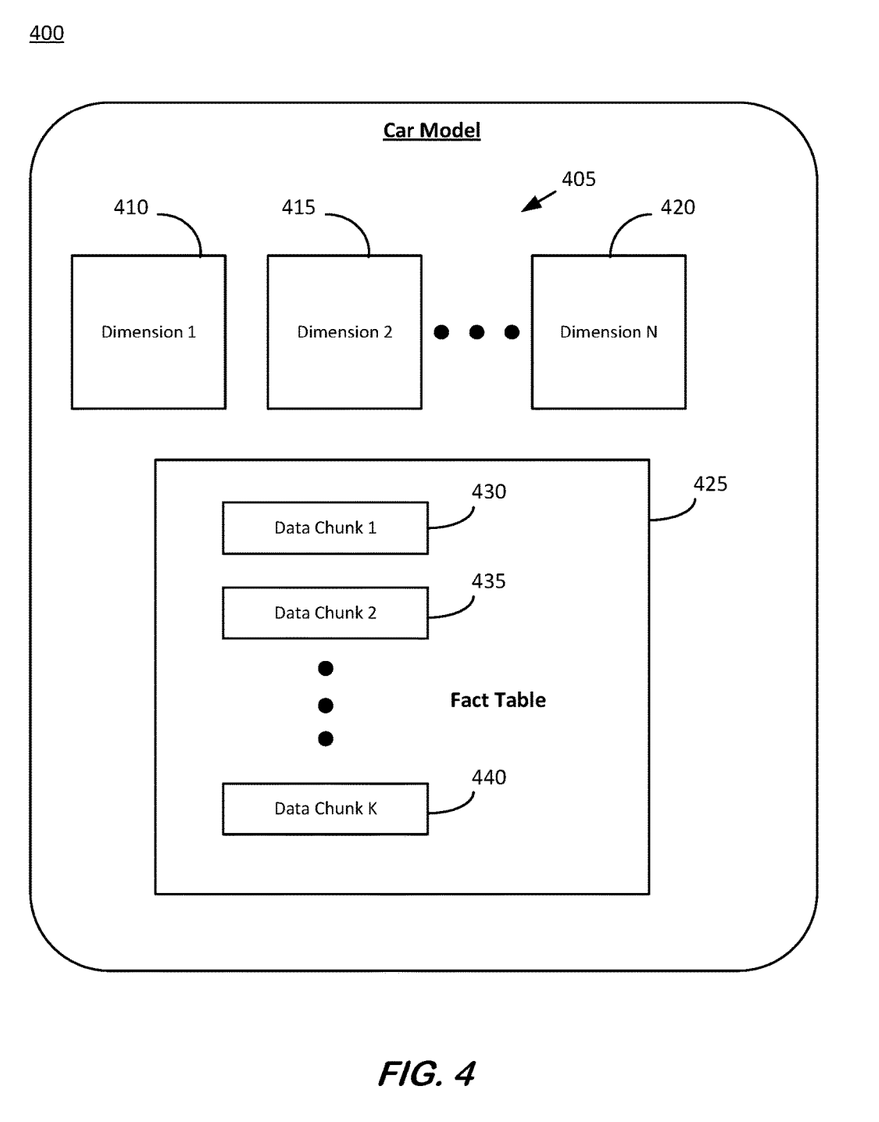
FIG. 4 is an illustrative depiction of a data model generated herein.

FIG. 4 is an illustrative depiction of a model generated in some embodiments herein. In some regards, model 400 may be a detailed view representation of the model 385 generated by the system of FIG. 3. As shown in FIG. 4, the model includes a plurality of dimensions 405 that may be used in analyzing (i.e., categorizing, presenting, etc.) measures of the fact table 425. In the current example, the plurality of dimensions includes dimensions 410, 415, and 420, whereas the fact table includes data chunks 430, 435, and 440.

Figure 5:
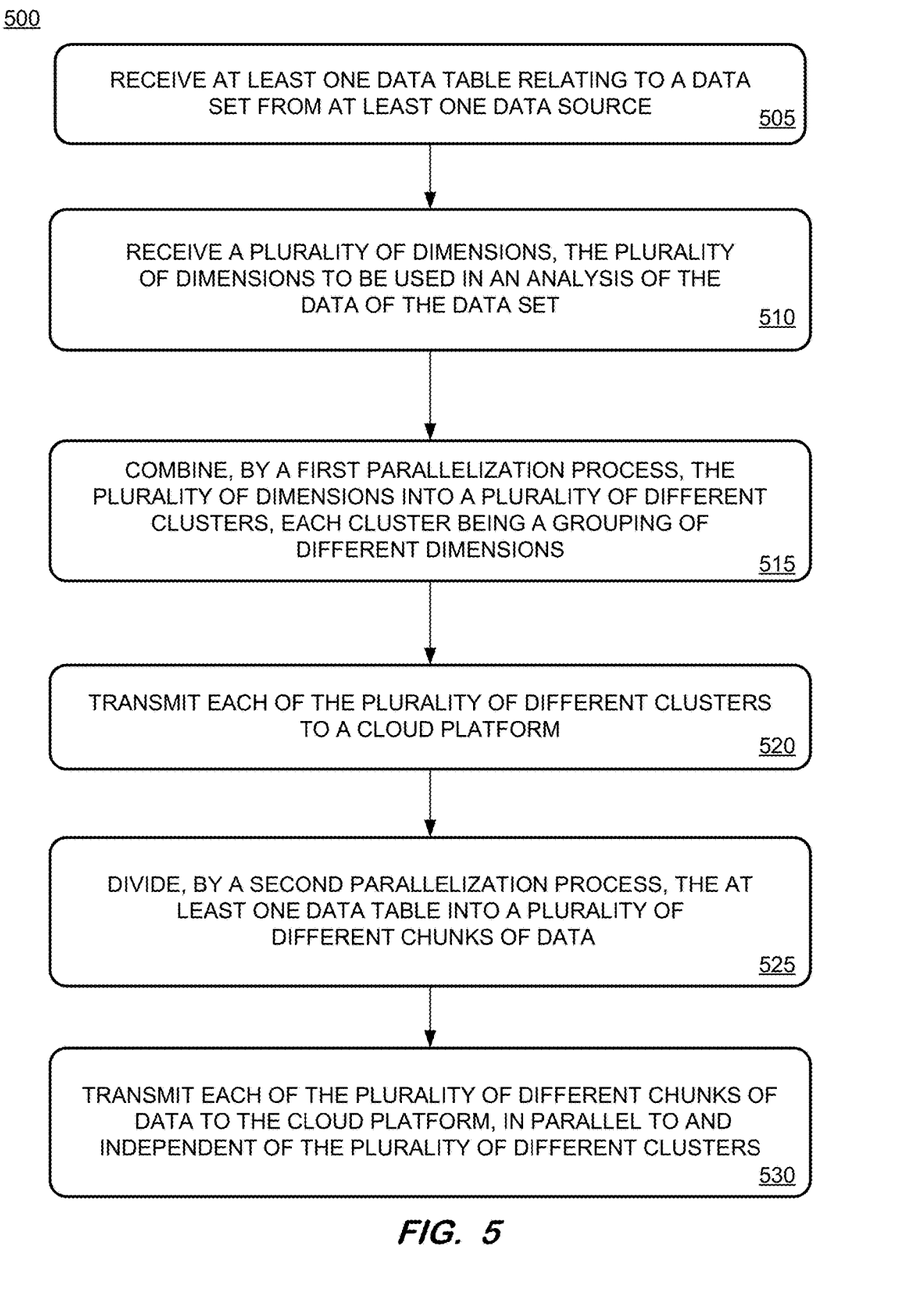
FIG. 5 is an example flow diagram of a process herein.

FIG. 5 is a flow diagram of an example process 500 in some embodiments. Process 500 includes receiving at least one data table relating to a data set from at least one source at operation 505. The data table (or other data structure) can include raw data or actual data relating to systems, operations, and processes. Operation 510 includes receiving a plurality of dimensions that may be used in an analysis of the data received at operation 505. Together, the data received at operation 505 and operation 510 may comprise (at least) the data needed to generate a desired model by a cloud platform.

Operation 515 is part of a parallelization process performed by a first parallelizer (e.g., a vertical parallelizer). Operation 515 includes grouping the received dimensions into different clusters of dimensions. In some aspects, the size and number of the clusters may be optimized in accord with one or more techniques.

At operation 520, each of the plurality of the different clusters is transmitted to a cloud platform. The different clusters may be transmitted in parallel, independent of each other.

Operation 525 is part of a parallelization process performed by a second parallelizer (e.g., a horizontal parallelizer). The labeling of one parallelizer herein as the "first" and the other as the "second" is provided solely as a means to distinguish the two from each other. No other significance is intended by such labeling herein. Moreover, the second parallelization process performed at operation 525 includes dividing the at least one data table into a plurality of different chunks of data. This dividing of the table data of a data set into different chunks might be optimized by chunking the data according to a size limit.

The parallelization aspects of operation 515 includes operation 520 and the parallelization aspects of operation 525 includes operation 530, such that the transmission of the plurality of the different chunks of data to the cloud program may be performed in parallel and independent of the transmission of the plurality of different dimension clusters, as stated in operation 530 of process 500.

In some embodiments, the processes (e.g., FIG. 5) and systems (e.g., FIGS. 1 and 3) disclosed herein may be optimized to execute in an optimal manner, given a number of considerations and/or parameters. In some aspects, the relevant parameters may be dynamically tuned so that a system in accordance with the present disclosure operates in an optimal manner.

The parallel model creation architecture disclosed herein includes two important underlying factors. As illustrated in the example of FIG. 3, there are two parameters that may be tuned in an effort to achieve optimal performance of the model creation, in some embodiments. Those two parameters include the number of dimensions (n1) and the number of data chunks (n2) to be processed. As such, there is a need to determine how many clusters (n1) should be used for the dimensions and how many data chunks (n2) should be used for the table data. This problem is referred to as a model creation problem herein and the two parameters of n1 and n2 will be determined in light of come constraints.

In order to optimize the model creation problem herein, a determination will be made regarding the size of the data chunks to be used. While the data chunks might vary in size, applicant(s) herein have realized that using the same size for all of the data chunks provides significant gains with a minimum of costs (e.g., processing time, computing resources, etc.). In keeping the size of the data chunks the same, the importance of the number of chunks is important. It is noted that the size of the individual chunks might be determined in some embodiments.

The number of dimension clusters (n1) and the number of data chunks (n2) can be determined by solving a multiple objective optimization problem as follows below.

It is noted that the total time to create a model might be expressed, in a simplified expression, as a combination of the time to successfully create a model (Tc); the time, given a failure, to recover the model after the failure (Tf); and the probability of a failure in creating the model. Together, these factors can combine to determine the total time need to create a model in a cloud platform herein.

In one regard, $T\text{total} = Tc + Tr^*Pf$  (1)

This formula is a simplified expression that treats the time to fail and the time to successfully create a model equally. However, this is not typically the case in reality. Accordingly, the relevant factors may be weighted in order to reflect the realities of an implementation. In some instances, the different contributors in equation (1) may be weighted to tune or focus the relationship on the failures or successful model creations. Such tuning may most likely depend on runtime environment that will impact the weighting parameters (e.g., a, b).

Accordingly, the optimization formulation may be represented by:

$T\text{total} = a^*Tc(n1,n2) + b^*Pf(n1,n2)^*Tr(n1,n2)$  (2)

where the objective is to minimize the total time to create the model (Ttotal), within some constraints. In some embodiments, equation (2) is subject to:

$a > 0, b > 0, n1 > 0, n2 > 0, c > 0$;

$Pf(n1,n2) <$ failure_tolerance_level; and $Tc(n1,n2) < c^*$(size_of_model+size_of_fact_table).

In some scenarios, we want to minimize the weighted sum of the successful model creation time Tc and the failure recovery time Pf*Tr. Here, a and b are predefined weights and Tc, Pf, and Tr are all functions of n1 and n2. When there are no failures, the successful model creation time (Tc) should have a linear upper bound determined by the size of the model creation problem. Hereinabove, c is a predefined parameter that represents the slope of the upper bound curve.

The failure probability constraint above should be below some threshold. That is, the probability of failure should not be too large, otherwise the system will not be useful. The threshold is the failure_tolerance_level listed above. Accordingly, Pf(n1, n2)<failure_tolerance_level is a constraint in this example.

As an example, an application service provider may guarantee a customer 99% service time in a contract for a service. It is further important to maintain data consistency as well since it is not desired to lose data or have data that is inaccurate. As such, the failure probability should be minimized.

It is noted that while it may be a goal to minimize the time to create a model, failures are not welcomed at the expense of speed. As such, an objective may be to minimize both time and failures.

Accordingly, the second constraint of to minimize successful model creation time (Tc) for a given model size is also considered. Taken together, these two constraints may be used to guarantee successful creation of a model in a given time for a particular size of model. That is, the model is created in less than some time.

Regarding equation (2), the optimization formula is a summation of two parts. There may be a desire or drive to minimize both components, in an effort to limit the overall result.

In some embodiments, the particular optimization formula that may be used in conjunction with the systems disclosed herein may vary from the specifically disclosed examples herein.

Figure 6:
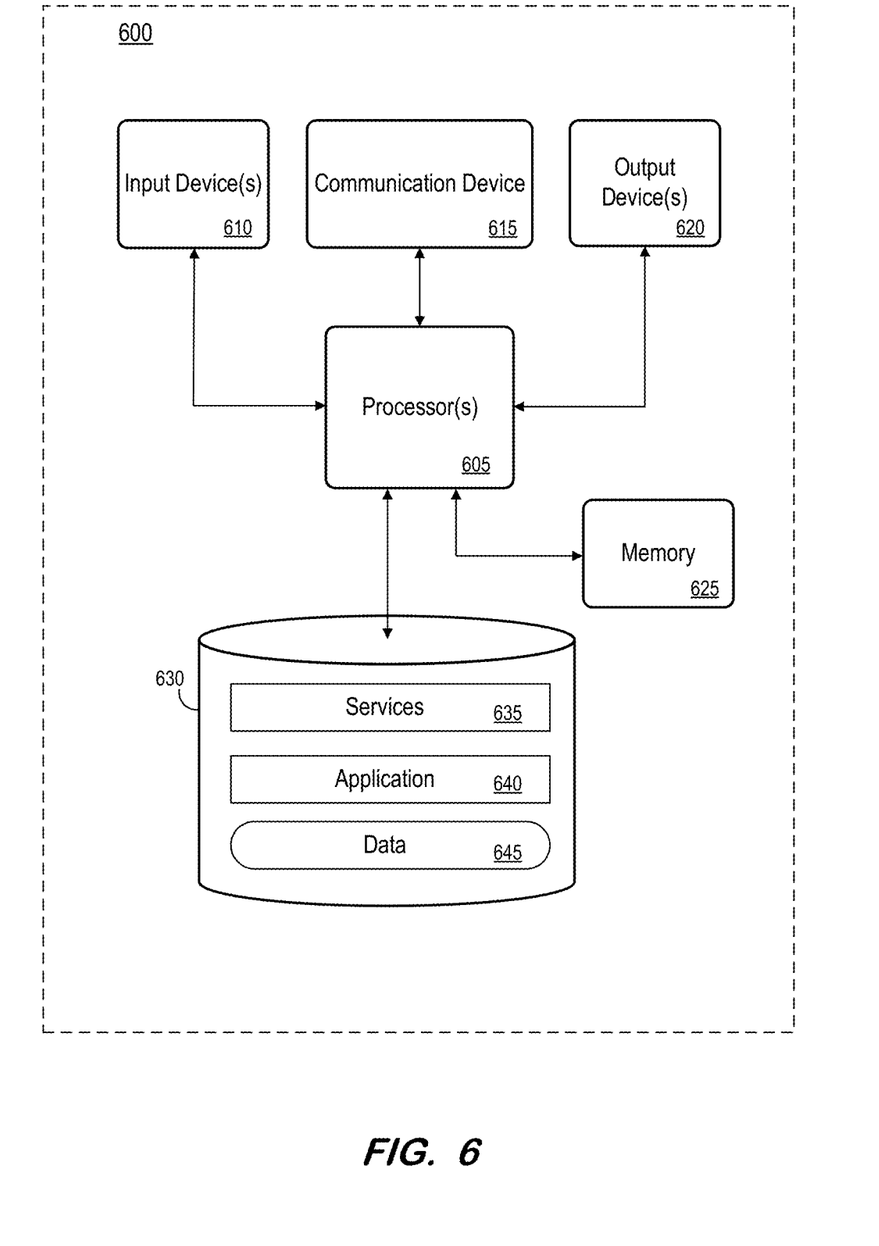
FIG. 6 is a block diagram of an apparatus, according to some embodiments.

Apparatus 600 includes processor 605 operatively coupled to communication device 620, data storage device 630, one or more input devices 610, one or more output devices 620 and memory 625. Communication device 615 may facilitate communication with external devices, such as a reporting client, or a data storage device. Input device(s) 610 may comprise, for example, a keyboard, a keypad, a mouse or other pointing device, a microphone, knob or a switch, an infra-red (IR) port, a docking station, and/or a touch screen. Input device(s) 610 may be used, for example, to enter information into apparatus 600. Output device(s) 620 may comprise, for example, a display (e.g., a display screen) a speaker, and/or a printer.

Data storage device 630 may comprise any appropriate persistent storage device, including combinations of magnetic storage devices (e.g., magnetic tape, hard disk drives and flash memory), optical storage devices, Read Only Memory (ROM) devices, etc., while memory 625 may comprise Random Access Memory (RAM), Storage Class Memory (SCM) or any other fast-access memory.

Services 635 and application 640 may comprise program code executed by processor 605 to cause apparatus 600 to perform any one or more of the processes described herein (e.g., FIGS. 3 and 5). Embodiments are not limited to execution of these processes by a single apparatus.

Data 645 (either cached or a full database) may be stored in volatile memory such as memory 625. Data storage device 630 may also store data and other program code and instructions for providing additional functionality and/or which are necessary for operation of apparatus 600, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a memory storing processor-executable instructions; and
a processor to execute the processor-executable instructions to cause the system to:
receive at least one data table relating to a data set from at least one data source external to a cloud platform;
receive, from a source external to the cloud platform, a user defined model including a plurality of dimensions, the plurality of dimensions to be used in an analysis of the data of the data set;
combine, by a first parallelizer, the plurality of dimensions of the user defined model into a plurality of different clusters, each cluster being a grouping of different dimensions of the plurality of dimensions, the first parallelizer determines an optimum number of the plurality of different clusters;
divide, by a second parallelizer, the at least one data table into a plurality of different chunks of data, each chunk of data being a subset of the whole data forming the at least one data table, the second parallelizer determines an optimum number of the plurality of different chunks of data; and
transmit, by the first parallelizer and at least partially in parallel with and independent of each other, each of the plurality of different clusters to the cloud platform in multiple parallel requests;
transmit, by the second parallelizer and at least partially in parallel with and independent of each other, each of the plurality of different chunks of data to the cloud platform, in parallel to and independent of the transmission of the plurality of different clusters to the cloud platform in multiple parallel requests, the transmitting of the plurality of clusters of dimensions and the transmitting of the plurality of different chunks of data of the at least one data table in the multiple requests thereof being transmitted in parallel and independent of each other;
generate, by the cloud platform, a data model based on a combination of the plurality of different clusters and the plurality of different chunks of data transmitted in the multiple requests; and
store the generated data model in a storage facility of the cloud platform.

2. The system of claim 1, wherein the at least one data table comprises measures of the data set.

3. The system of claim 1, wherein each of the clusters is transmitted via a message to the cloud platform.

4. The system of claim 1, wherein
the processor determines a minimum time to generate the data model based on, at least in part, the determined optimum number of the plurality of different clusters and the determined optimum number of the plurality of different chunks of data.

5. The system of claim 4, wherein the minimum time to generate the data model is constrained by at least one of a failure probability being less than a threshold, a minimum successful data model creation time, and combinations thereof.

6. A method comprising:
receiving, by a processor, at least one data table relating to a data set from at least one data source external to a cloud platform;
receiving, by the processor from a source external to the cloud platform, a user defined model including a plurality of dimensions, the plurality of dimensions to be used in an analysis of the data of the data set;
combining, by a first parallelizer, the plurality of dimensions of the user defined model into a plurality of different clusters, each cluster being a grouping of different dimensions of the plurality of dimensions, the first parallelizer determines an optimum number of the plurality of different clusters;
transmitting, by the first parallelizer and at least partially in parallel with and independent of each other, each of the plurality of different clusters to the cloud platform in multiple parallel requests;
dividing, by a second parallelizer, the at least one data table into a plurality of different chunks of data, each chunk of data being a subset of the whole data forming the at least one data table, the second parallelizer determines an optimum number of the plurality of different chunks of data;
transmitting, by the second parallelizer and at least partially in parallel with each other, each of the plurality of different chunks of data to the cloud platform, in parallel to and independent of the transmission of the plurality of different clusters to the cloud platform in multiple parallel requests, the transmitting of the plurality of clusters of dimensions and the transmitting of the plurality of different chunks of data of the at least one data table in the multiple requests thereof being transmitted in parallel and independent of each other;
generate generating, by the cloud platform, a data model based on a combination of the plurality of different clusters and the plurality of different chunks of data transmitted in the multiple requests; and
storing the generated data model in a storage facility of the cloud platform.

7. The method of claim 6, wherein the at least one data table comprises measures of the data set.

8. The method of claim 6, wherein each of the clusters is transmitted via a message to the cloud platform.

9. The method of claim 6, further comprising:
determining, by the processor, a minimum time to generate the data model based on, at least in part, the determined optimum number of the plurality of different clusters and the determined optimum number of the plurality of different chunks of data.

10. The method of claim 9, wherein the minimum time to generate the data model is constrained by at least one of a failure probability being less than a threshold, a minimum successful data model creation time, and combinations thereof.

11. A non-transitory computer-readable medium having processor executable instructions stored thereon, the medium comprising:
instructions to receive at least one data table relating to a data set from at least one data source external to a cloud platform;
instructions to receive, from a source external to the cloud platform, a user defined model including a plurality of dimensions, the plurality of dimensions to be used in an analysis of the data of the data set;
instructions to combine, by a first parallelizer, the plurality of dimensions of the user defined model into a plurality of different clusters, each cluster being a grouping of different dimensions of the plurality of dimensions, the first parallelizer determines an optimum number of the plurality of different clusters;
instructions to transmit, by the first parallelizer and at least partially in parallel with and independent of each other, each of the plurality of different clusters to the cloud platform in multiple parallel requests;
instructions to divide, by a second parallelizer, the at least one data table into a plurality of different chunks of data, each chunk of data being a subset of the whole data forming the at least one data table, the second parallelizer determines an optimum number of the plurality of different chunks of data; and
instructions to transmit, by the second parallelization processor and at least partially in parallel with and independent of each other, each of the plurality of different chunks of data to the cloud platform, in parallel to and independent of the transmission of the plurality of different clusters to the cloud platform in multiple parallel requests, the transmitting of the plurality of clusters of dimensions and the transmitting of the plurality of different chunks of data of the at least one data table in the multiple requests thereof being transmitted in parallel and independent of each other;
instructions to generate, by the cloud platform, a data model based on a combination of the transmitted plurality of different clusters and the transmitted plurality of different chunks of data transmitted in the multiple requests; and
instructions to store the generated data model in a storage facility of the cloud platform.

12. The non-transitory computer-readable medium of claim 11, wherein the at least one data table comprises measures of the data set.

13. The non-transitory computer-readable medium of claim 11, wherein each of the clusters is transmitted via a message to the cloud platform.

14. The non-transitory computer-readable medium of claim 11, further comprising:
instructions for the processor to determine a minimum time to generate the data model based on, at least in part, the determined optimum number of the plurality of different clusters and the determined optimum number of the plurality of different chunks of data.

* * * * *